United States Patent Office 3,064,035
Patented Nov. 13, 1962

3,064,035
TRICHLORINATED CYANOESTER
Peter L. de Benneville, Philadelphia, and Heinz W. Blessing, Levittown, Pa., assignors to Rohm & Haas Company, Philadelphia, Pa., a corporation of Delaware
No Drawing. Filed Aug. 18, 1959, Ser. No. 834,412
4 Claims. (Cl. 260—465.4)

This invention deals with a specific trichlorinated cyanoester as a new composition of matter. It further deals with a method for the preparation of this specific trichlorinated cyanoester.

The compound of this invention is represented by the formula $$CNCCl_2CH_2COOCH_2Cl$$

and is named chloromethyl 3-cyano-3,3-dichloropropionate.

The product of this invention is prepared by chlorinating chloromethyl 3-cyanopropionate. The chloromethyl 3-cyanopropionate reactant may be prepared according to the method disclosed in Serial No. 834,410, filed August 18, 1959.

The present process is conducted by passing the chlorine into a reaction vessel containing a cyanoester reactant. The chlorine may be employed in a liquid or a gaeous form, but it is preferred to use it in the gaeous form and bubble it up through the cyanoester reactant. It is desirable to saturate the reaction medium with hydrogen chloride in gaseous form and substantially dry before the introduction of the halogen itself. We have also found it sometimes advantageous to introduce hydrogen chloride in small amounts along with the chlorine. Particularly towards the end of the reaction, it appears to be preferable to maintain the reaction mixture in a condition of saturation with hydrogen chloride. This provides a more rapid reaction at this final stage.

The reaction is carried out in the substantial absence of actinic light although the presence of diffuse light is not objectionable. The reaction is continued until no more chlorine is taken up by the system, as will be clear to one skilled in the art. This will, in general, correspond to a gain in weight slightly more than required for the absorption of two atoms of chlorine because of the presence of dissolved gases.

It may be desirable in some instances to use small amounts of metallic chlorides in order to expedite the reaction but such is not necessary. In this respect, there may be used zinc chloride, aluminum chloride, and the like.

The reaction is exothermic in nature and no heat need be added. In fact, it is desirable to conduct the reaction at a temperature no higher than 125° C. and preferably in the range of 35° to 85° C. Halogenation starts to occur in appreciable amounts at about 20° C. At the conclusion of the reaction, the reaction system is purged with nitrogen gas. The product may be further purified, if desired, by distillation.

The product of this invention is especially valuable as a herbicide and is quite effective against dicotyledonous plants in both pre-emergence and post-emergence applications. This compound is more effective when employed in post-emergence applications, according to standard procedures. The compound of this invention is also a useful herbicide against monocotyledonous plants, particularly in post-emergence applications. Maximum results are obtained when the present product is used in a concentration of about 10 pounds per acre and applied either as a spray, wettable powder, or dust in the known inert carriers. The product of this invention, when applied at the rate of 10 pounds per acre, gives complete control of crab grass, millet, wild carrot, and pigweed and gives excellent control of foxtail, lambs quarter, sorrel, dock and mallow.

The present invention may be more fully understood by the following illustrative example. Parts by weight are used throughout.

*Example*

There is added to a reaction vessel 29.5 parts of chloromethyl 3-cyanopropionate. The chloromethyl 3-cyanopropionate is saturated with hydrogen chloride and then chlorine is added slowly for a period of several hours. The temperature of the reaction medium is maintained at 35°–50° C. After 13.8 parts of chlorine have reacted, the reaction is concluded and the reaction mixture distilled. The product is isolated at 103° to 113½° C. at 5 mm. absolute pressure. The product has an $n_D^{25}$ value of 1.4778–1.4785 and contains 28.22% carbon (27.72% theoretical), 1.74% hydrogen (1.86% theoretical), 47.88% chlorine (49.20% theoretical), and 6.62% nitrogen (6.46% theoretical).

We claim:
1. As a composition of matter, chloromethyl 3-cyano-3,3-dichloropropionate.
2. A method for the preparation of chloromethyl 3-cyano-3,3-dichloropropionate, which comprises reacting in the presence of hydrogen chloride chlorine with chloromethyl 3-cyanopropionate in the temperature range of 20° to 125° C. in the substantial absence of actinic light.
3. A method according to claim 2 in which the temperature is 35° to 85° C.
4. A method according to claim 2 in which the reaction medium is saturated with hydrogen chloride.

References Cited in the file of this patent
UNITED STATES PATENTS
2,745,868     Kabisch _____ May 15, 1956
FOREIGN PATENTS
962,071       Germany _____ Apr. 18, 1957
OTHER REFERENCES
Treibs et al.: Ber., Vol. 90, pages 1146–1152 (1957).